United States Patent [19]

Yoneda et al.

[11] Patent Number: 5,065,500
[45] Date of Patent: Nov. 19, 1991

[54] METHOD OF MANUFACTURING A MAGNETIC HEAD ASSEMBLY INCLUDING A MAGNETIC RECORDING MEDIUM SLIDE SURFACE HAVING GROOVES FORMED THEREON

[75] Inventors: Kou Yoneda, Machida; Takeshi Sawada, Yamato, both of Japan

[73] Assignee: Canon Kabushiki Kaisha, Tokyo, Japan

[21] Appl. No.: 537,143

[22] Filed: Jun. 12, 1990

Related U.S. Application Data

[63] Continuation of Ser. No. 284,816, Dec. 14, 1988, abandoned, which is a continuation of Ser. No. 901,779, Aug. 29, 1986, abandoned.

[30] Foreign Application Priority Data

Sep. 5, 1985 [JP] Japan ................. 60-194930

[51] Int. Cl.[5] .................................. G11B 5/42
[52] U.S. Cl. ..................... 29/603; 360/103; 360/122
[58] Field of Search ............ 29/603; 360/102, 103, 360/104, 122, 129

[56] References Cited

U.S. PATENT DOCUMENTS

| | | | |
|---|---|---|---|
| 3,398,870 | 8/1968 | Mullan et al. | 360/103 X |
| 3,872,507 | 3/1977 | Sano et al. | 360/102 |
| 3,961,372 | 6/1976 | Brock et al. | 360/102 |
| 4,375,656 | 3/1983 | Radman, Jr. et al. | 360/102 |
| 4,435,900 | 3/1984 | DeWilde | 29/603 |
| 4,479,158 | 10/1984 | Froehlich et al. | 360/102 X |
| 4,546,541 | 10/1985 | Reid | 29/603 |
| 4,553,184 | 11/1985 | Ogishima | 360/104 X |
| 4,636,898 | 1/1987 | Suzuki et al. | 360/122 |

FOREIGN PATENT DOCUMENTS

| | | | |
|---|---|---|---|
| 2840500 | 4/1979 | Fed. Rep. of Germany | 360/102 |
| 0150121 | 9/1982 | Japan | 360/125 |

OTHER PUBLICATIONS

Ono et al., Air-Lubricated Transverse Scan Rotating Head Mechanism, vol. 28, Nos. 5–6, May–Jun. 1980.

*Primary Examiner*—Carl E. Hall
*Attorney, Agent, or Firm*—Fitzpatrick, Cella, Harper & Scinto

[57] ABSTRACT

A magnetic head assembly in which grooves, extending in the slide direction of a magnetic recording medium, are formed on both sides of an electro-magnetic converting section on the surface where the magnetic recording medium slides.

4 Claims, 4 Drawing Sheets

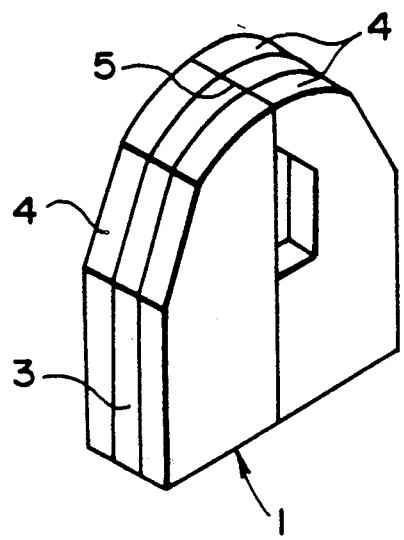
FIG. I
PRIOR ART
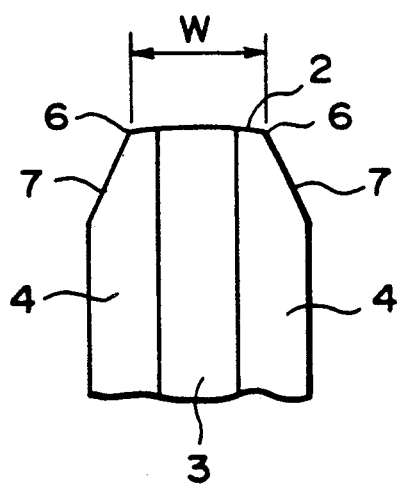
FIG. 2A
PRIOR ART
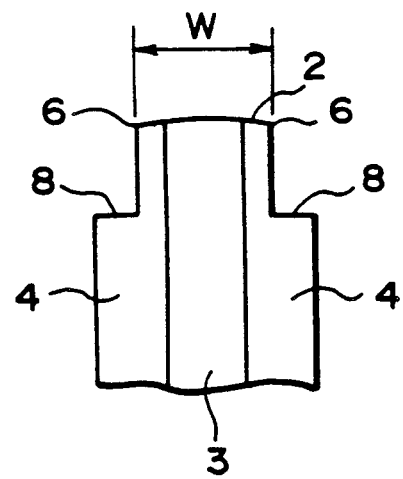
FIG. 2B
PRIOR ART

METHOD OF MANUFACTURING A MAGNETIC HEAD ASSEMBLY INCLUDING A MAGNETIC RECORDING MEDIUM SLIDE SURFACE HAVING GROOVES FORMED THEREON

This application is a continuation of application Ser. No. 07/284,816 filed Dec. 14, 1988 which was a continuation of application Ser. No. 07/901,779 filed Aug. 29, 1986, both now abandoned.

BACKGROUND OF THE INVENTION

1. Field of the Invention

The present invention relates to a magnetic head assembly and, more particularly, to a magnetic head assembly which slides and comes into contact with a magnetic recording medium, thereby recording and reproducing information.

2. Related Background Art

Magnetic recording/reproducing systems are widely used to record and reproduce various information such as audio information in the case of tape recorders or the like, characters, numerical information, image information, and the like in the case of magnetic disk apparatuses.

In general, the magnetic recording and reproducing are performed by use of a magnetic recording medium such as a magnetic tape, magnetic disk, or the like serving to store information as a magnetic signal, and a magnetic head assembly for recording the information in the magnetic recording medium or reproducing the information therefrom, by converting the information from an electric signal to a magnetic signal or converting the information from a magnetic signal to an electric signal.

To transmit and receive the information between the magnetic head and the magnetic recording medium, the magnetic gap of the magnetic head to record or reproduce the information needs to be near the magnetic recording medium, as close as possible. The distance between the magnetic gap and the magnetic recording medium is called the spacing. When the spacing is large, both recording and reproducing efficiencies fairly deteriorate. For example, upon reproduction, the deterioration of the reproduced output due to the spacing, what is called a spacing loss Ls, is expressed by the following expression.

$$Ls = -54.6\, d/\lambda\, (dB) \ldots \quad (1)$$

Where d denotes the spacing and $\lambda$ indicates a wavelength of the reproduced signal.

From this expression, therefore, it will be understood that when $\lambda$ is 0.5 $\mu$m, the output decreases by about 10 dB due to the increase in spacing d of merely 0.1 $\mu$m. The amount of decrease in the output is determined by only the spacing, independently of the performance of the magnetic head and the magnetic recording medium.

Therefore, it will be appreciated that the spacing is more important than the magnetic head and magnetic recording medium in determining the performance of the whole magnetic recording system. In addition, in recent years, a signal of a shorter wavelength is used due to the requirement of high density. Therefore, as will be also understood from expression (1), it is more and more important to reduce the spacing as much as possible.

In general, when the head and medium having relative speeds approach each other, a substantial pressure is generated by the air lubricating layer the narrow gap between the head slide surface and the medium. Thus, in the case of the flexible magnetic recording medium such as a floppy disk or the like, the medium can be deformed so as to be balanced with the substantial pressure and the spacing distribution. Since the substantial pressure at this time depends on the shape of the head slide surface, the shape of the head slide surface is the significant factor when the spacing is set.

FIG. 1 shows the shape of a conventional video head for recording and reproducing information in and from one magnetic track.

A video head 1 is constituted by adhering a reinforcing plate 4 so as to sandwich a magnetic core 3. As shown in FIG. 2A, for instance, a head slide surface 2 is formed by cylindrically grinding the magnetic gap surface of a magnetic gap 5, or by another method. FIGS. 2A and 2B illustrate cross-sectional views of different structures of the magnetic gap portion in FIG. 1.

In the example of FIG. 2A, chamfered portions 7 are formed on both ends in the direction of the track width of the slide surface 2. Thus, the width w in the track direction of the head slide surface is narrowed and the area of the head slide surface is reduced, thereby decreasing the substantial pressure which will be generated in the air lubricating layer between the medium and the magnetic head and also minimizing the spacing. In the example of FIG. 2B, in place of the chamfers, notches 8 are formed in both edge portions in the direction of the track width, thereby obtaining a similar effect.

However, the foregoing conventional structures have the following problems. First, since corner portions 6 at the edges in the track direction of the head slide surface are likely to be abraded, these portions are abraded in association with the use of the head for a long time and the shape of the slide surface changes. Thus, there is a limitation on the use of these designs when the chamfers and notches are allowed to approach the track, and the degree of freedom in setting of the spacing is restricted. On the other hand, as shown in FIG. 2A, since the width w in the track width direction of the slide surface of the chamfered head is widened as the head is abraded, the spacing amount varies as the head is used. Further, in the case of the notched head as shown in FIG. 2B, although the width w does not change, the width itself of the core becomes small due to the notches 8, that there is the problem of a decrease in strength with respect to the weight in the lateral direction.

Although the examples of a one-channel head assembly for use with one track have been shown above, in the case of the magnetic head assembly having the channels for as many as two tracks, the slide surface itself is wide. Therefore, even when the chamfers and notches as shown in FIGS. 2A and 2B are formed, it is difficult to narrow the width w of the slide surface to a value according to a desired spacing condition. In particular, in the case of the head assembly for use with multitracks, the slide surface is fairly large; therefore, the spacing can be hardly effectively adjusted by the foregoing methods.

SUMMARY OF THE INVENTION

It is an object of the present invention to provide a magnetic head assembly which can solve the foregoing problems.

Another object of the invention is to provide a magnetic head assembly which can prevent the deformation of the magnetic recording medium and can reduce the spacing loss between the head and the medium.

To achieve these objectives, according to one embodiment of the present invention, there is provided a magnetic head assembly including a magnetic core; and a magnetic gap formed in this magnetic core, wherein on the slide surface of a magnetic recording medium, the assembly is formed with grooves extending in the slide direction of the magnetic recording medium on both sides of the magnetic gap.

The above and other objects and features of the present invention will become apparent from the following detailed description and the appended claims with reference to the accompanying drawings.

BRIEF DESCRIPTION OF THE DRAWINGS

FIG. 1 is a perspective view showing the structure of a conventional magnetic head;

FIGS. 2A and 2B are cross sectional views showing different cross-sectional structures of the magnetic head of FIG. 1;

DETAILED DESCRIPTION OF PREFERRED EMBODIMENTS

The invention will now be described in detail hereinbelow with respect to embodiments shown in the diagrams.

First Embodiment

Figure 3A:
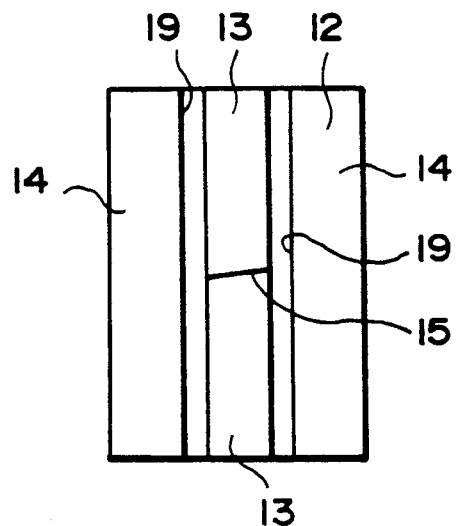
FIGS. 3A and 3B are a front view and a cross-sectional view of a magnetic head assembly in the first embodiment of the present invention, respectively.
Figure 3B:
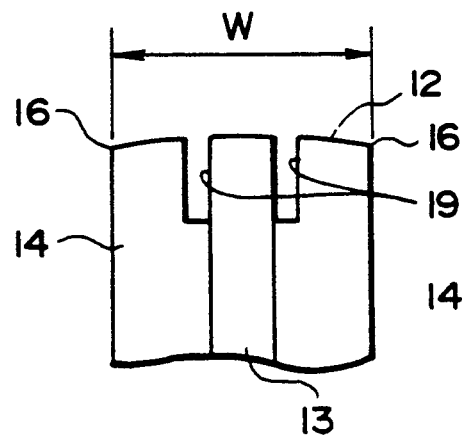

FIGS. 3A and 3B show cross sectional views of the top surface and medium slide surface of a magnetic head for a track in the first embodiment of the invention. As shown in the diagrams, the magnetic head of this embodiment is constituted in a manner such that a core 13 having a magnetic gap 15 is sandwiched by reinforcing plates 14 from both sides in a manner similar to the head shown in FIG. 1.

Grooves 19 having a predetermined depth are formed in the boundary portions of the reinforcing plates 14 on both sides of the core 13 with the core in between. To manufacture such a head, for example, the reinforcing plates 14, in which the notches serving later as the grooves 19 have previously been formed at the corners, which will become the boundaries with the core are formed. The core, 13 may be adhered and sandwiched by the reinforcing plates 14.

According to this embodiment, the substantial pressure which is generated in the air lubricating layer between a head slide surface 12 and the recording medium when the head moves can be reduced by the grooves 19, so that a narrow spacing can be attained. In this case, no problem will be caused even if the head width w in the direction of a track including the reinforcing plates is wide. This is because the substantial pressure which is generated in the lubricating layer is not proportional to the area of the slide surface 12 in the case of this embodiment.

Figure 4:
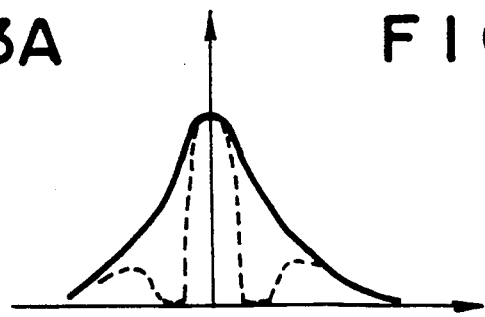
FIG. 4 is a diagram showing the pressure distribution in the magnetic head assembly of FIGS. 3A and 3B.

To explain this point, FIG. 4 shows a distribution of the substantial pressure value (a value which is derived by subtracting the atmospheric pressure from the pressure) which is generated between the head and the medium when the head moves. A solid line indicates the pressure distribution in the conventional case when the grooves 19 are not formed and a broken line represents the pressure distribution in the case when the grooves 19 are formed as in this embodiment. As shown in the diagram, in this embodiment, since no slide surface exists in the portions of the grooves 19, no substantial pressure is generated in these portions and the substantial pressure becomes almost 0 (equals atmospheric pressure). Thus, the substantial pressure value of the whole head fairly decreases.

Therefore, if the recording medium having the same physical property is used, the spacing can be remarkably reduced as compared with the conventional example.

When considering the case wherein no groove is formed, the value of the substantial pressure between the slide surface 12 and the medium is the largest at the center of the track (core portion). Therefore, it will be understood that by forming the grooves at positions near the core, the pressure can be effectively reduced. On the other hand, the pressure at a position away from the core is not so inherently high; therefore, even if the areas near corner portions 16 in those portions (e.g., FIG. 3B) are wide, the spacing will be hardly influenced.

For the above reasons, according to this embodiment, there is no need to reduce the area of the whole head slide surface 12, and by forming the grooves near the central portion of the head as close as possible, for example, on both sides of the magnetic head, the spacing is decreased and the spacing loss can be reduced.

Further, in this embodiment, different from the case of narrowing the width of the slide surface as in the conventional example, the corner portions 16 as the edge portions in the direction of the track width are away from the center of the track. Thus, even if these portions are chipped or abraded, a change in slide shape will not occur near the track.

On the other hand, the weight to be applied to the head portion is also distributed into a wider area range as compared with the conventional example, so that the influence will be hardly exerted on the magnetic gap portion. In particular, since the weight in the lateral direction is hardly changed, this embodiment is extremely advantageous in terms of the strength as compared with the conventional example. Further, even if the head is abraded because of the use of the head for a long time, the effect to reduce the pressure in the air lubricating layer by the grooves 19 will not change. Consequently, the narrow spacing can be stably kept for a long period of time as compared with a conventional head.

Second Embodiment

Figure 5:
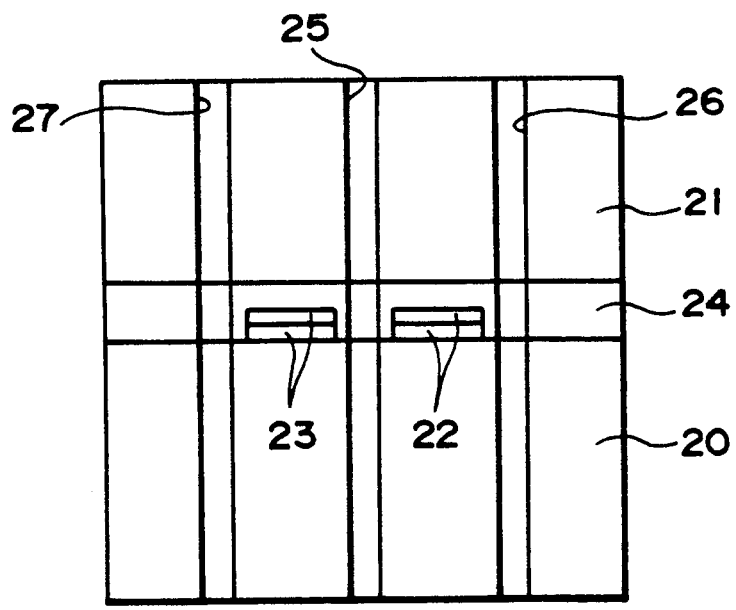
FIG. 5 is a front view of a magnetic head assembly in the second embodiment of the invention.

Next, the second embodiment of the invention is illustrated in FIG. 5. FIG. 5 shows a medium slide surface of a magnetic head for a video floppy disk adapted to record and reproduce still images.

A magnetic core of a thin film is formed on a base plate 20. Reinforcing plates 21 are adhered in the upper half portions in the diagram through adhesive layers 24. Only magnetic pole portions 22 and 23 of the core face the slide surface.

The magnetic pole portions 22 and 23 record and reproduce information on and from two magnetic tracks. Grooves 25, 26, and 27 are formed in the slide surfaces of the reinforcing plates 21 and base plate 20 corresponding to the intermediate portion and both side portions of the magnetic pole portions 22 and 23.

According to the two-track head of FIG. 5, the track width is set to 60 μm and the distance between the tracks is set to 40 μm corresponding to the current standard of the video floppy disk. Therefore, the width of the slide surface of the whole head is about 160 μm and the slide surface is much wider than the track width of the head in the home-use VTR. In such a head, it is very difficult to narrow the slide surface width in the direction of the track width in order to reduce the spacing by the method as in the conventional example.

However, as in this embodiment, by forming the grooves 25 to 27, the substantial pressure of the air lubricating layer can be reduced and the spacing can be decreased without& needing to change the area of the whole slide surface. Although the reason why the effect by the grooves is obtained is similar to the case of the first embodiment, in the case of this embodiment, the substantial pressure can be remarkably reduced in spite of the fact that the width of the slide surface is wide.

Namely, as shown in FIG. 4, since the pressure in the air lubricating layer is the highest in the central portion of the track, by forming the groove 25 in the central portion as shown in FIG. 5, the pressure in this portion can be reduced and the average pressure of the whole head can be effectively lowered.

According to this embodiment, when the width of a groove is 20 μm and the depth of a groove is 5 μm, the spacing could be reduced by ¼ and the spacing amount of 0.1 to 0.2 μm could be realized. Moreover, there is no need to change the shape of the slide surface other than the grooves.

As described above, in this embodiment, although the track width is wide, the narrow spacing to be needed in practical use can be advantageously realized. Further, this advantage is independent of the shape of the whole slide surface. Consequently, by forming the whole slide surface into a predetermined shape, only the spacing amount can be set to a necessary value to maintain the stability and durability of the head. In other words, in spite of the fact that the track width is wide, there is the advantage such that the stable and durable narrow spacing can be realized.

In the embodiment shown in FIG. 5, three grooves were formed.

However, only the groove 25 between two tracks, which can provide the maximum effect, may be formed. In this case as well, it has been confirmed that the effect which is almost the same as that above can be obtained.

Third Embodiment

Figure 6:
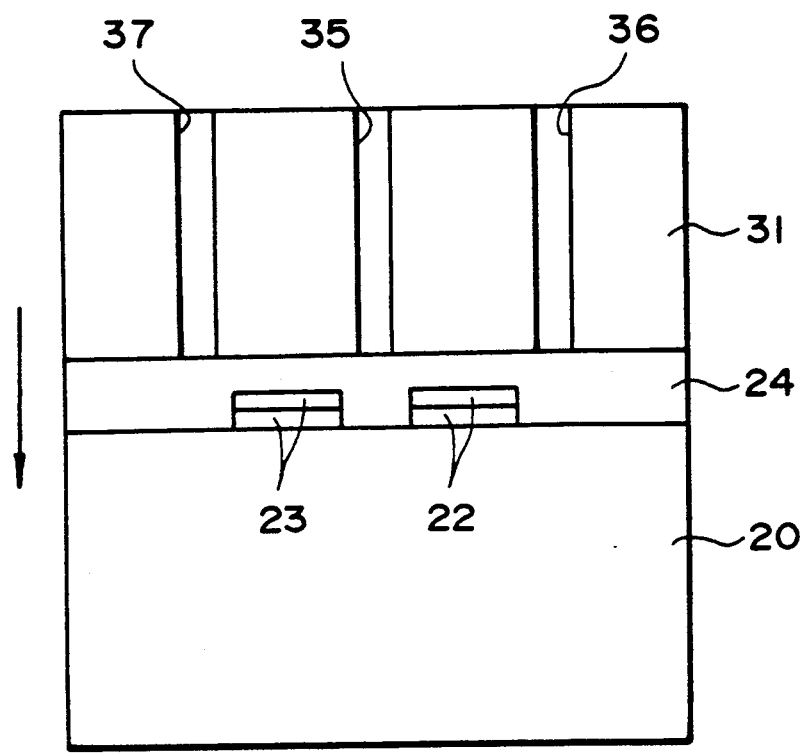
FIG. 6 is a front view of a magnetic head assembly in the third embodiment of the invention.

The third embodiment of the invention is shown in FIG. 6. FIG. 6 illustrates the slide surface of a magnetic head for use with a video floppy disk similar to that in FIG. 5.

In this embodiment, the medium slide surface has grooves 35, 36, and 37 which are formed only in adhered reinforcing plates 31.

With this constitution, the effect to of reducing the spacing which is almost the same as that in the second embodiment also can be achieved. However, in this case, the head is used by being positioned on the side where the reinforcing plates 31 enter the head of the medium (the entering direction is indicated by an arrow in FIG. 6).

In general, the pressure in the air lubricating layer becomes relatively substantial on the medium entering side and becomes negative on the medium exiting side. Therefore, by forming the groove on the medium entering side where substantial pressure is generated, the pressure can be reduced in substantially the same manner as in the case wherein the grooves are formed as a whole, so that the spacing can be decreased.

Further, in this embodiment, the head can be constituted by adhering the reinforcing plates thereto, in which grooves have previously been formed. Thus, there is the advantage such that the head assembly can be more easily manufactured than in the second embodiment.

Fourth Embodiment

Figure 7:
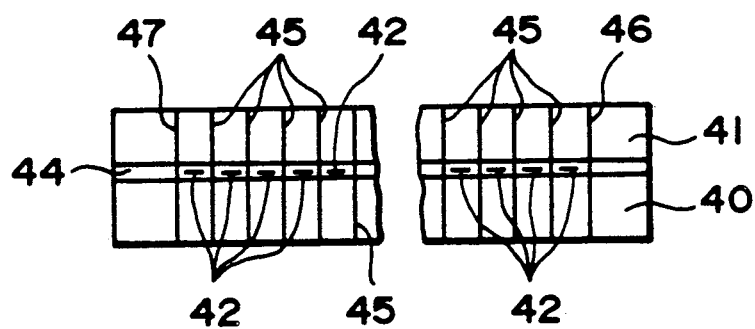
FIG. 7 is a front view of a magnetic head assembly in the fourth embodiment of the invention.

FIG. 7 shows the fourth embodiment of the invention. FIG. 7 illustrates the medium slide surface of a fifty-track head adapted to record and reproduce information on and from fifty tracks (the central portion is not shown in the diagram).

A magnetic core is formed on a base plate 40 in a manner similar to the second and third embodiments. Only the portions of fifty magnetic poles 42 are exposed to the slide surface. Reinforcing plates 41 are adhered through adhesive layers 44.

In this embodiment, similar to the case of the second embodiment, forty-nine grooves 45 are formed at the positions between the tracks on the slide surfaces of the base plates 40 and reinforcing plates 41. Two grooves 46 and 47 are also formed at the positions of both side portions of the tracks. Since the track pitch is 100 μm in accordance with the standard of the still video, the length in the track direction of fifty tracks is about 5 mm. Therefore, the shape of the slide surface of the head is cylindrical, which is different from the spherical shape of a single track. In general, the pressure which is generated in the lubricating layer between such a magnetic head and the medium is large and the spacing is about ten times as wide as that in the case of a single-track head. Therefore, a pad to press the medium onto the head and the like needs to be devised. However, it is extremely difficult to set the practical spacing amount.

However, in this embodiment, by forming the grooves 45, 46, and 47, the pressure in the lubricating layer can be remarkably reduced and narrow spacing can be realized. This point is based on the reason which is substantially the same as that described in the second embodiment. According to this embodiment, only the small spacing need be set, and when the spacing is set, excessive stresses do not need to be applied to the head, the medium, and the like. Thus, there is the advantage that the medium can be stably run with excellent durability.

In addition, such a structure can be also modified in a manner such that the groove is formed only in the reinforcing plate 41 on the medium entering side as in the third embodiment. With this constitution, the head assembly also can be very easily manufactured.

With Respect to the Shape of the Groove

The constitutions in which the grooves are formed in the slide surfaces of various magnetic heads were shown by the above four embodiments. The shape of the groove will now be considered hereinbelow.

Figure 8:
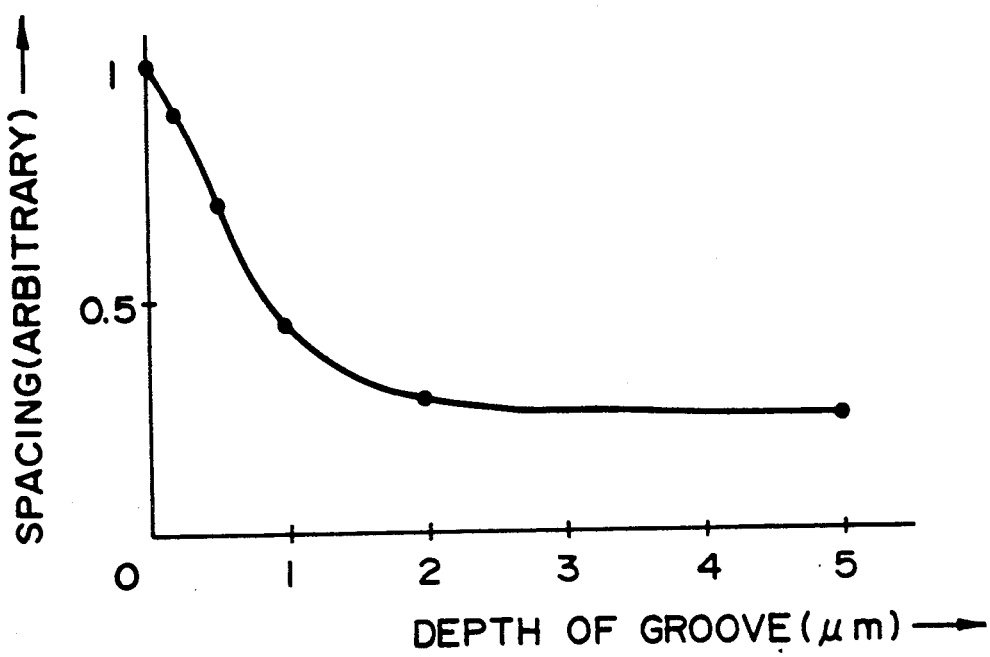
FIGS. 8 and 9 are diagrams showing the relations among the depth and width of the groove and the spacing, respectively.
Figure 9:
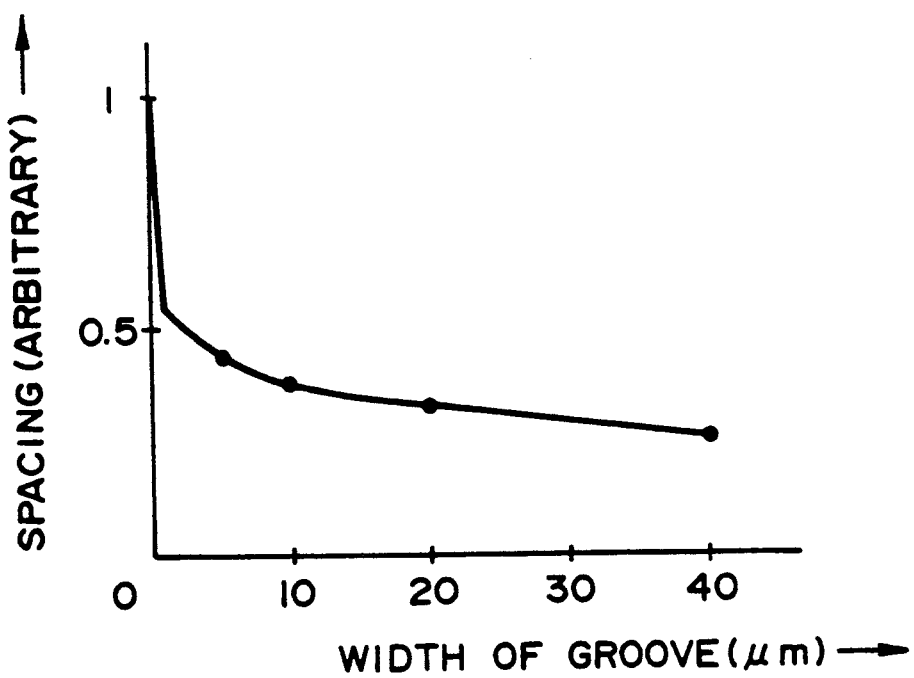

FIGS. 8 and 9 show the relations among the depth and width of a groove and the spacing in the two-track head for use in the video floppy disk in the second embodiment. The groove was formed in only the central portion of the track (only the groove 25 in FIG. 5.).

As will be understood from FIG. 8, when the depth of groove is about 2 $\mu$m, it is possible to obtain the effect similar to the case when the depth of groove is set to be deeper than 2 $\mu$m. In addition, when the depth of groove is about 1 $\mu$m, the spacing can be reduced to about ½. Therefore, it will be appreciated that the sufficient spacing reducing effect can be obtained if the depth of groove is above 1 $\mu$m. On the other hand, as shown in FIG. 7, a sufficient spacing reducing effect can be attained when the width of groove is above about 10 $\mu$m.

The depth and width of the groove may be set to proper values which satisfy the above-mentioned values in accordance with the thickness of reinforcing plate and other manufacturing conditions.

The foregoing values of the depth and width of the groove must be assured. A groove above those dimensions needs to be continuously formed until reaching the edge portion of the head slide surface. If the dimensions of the groove decrease to values lower than these values or the groove is stopped in the way of the edge portion of the head slide surface, it has been found that the effect of the groove is fairly lost or extinguished.

As shown in the third embodiment, even if the groove is stopped on the exiting side of the medium when the groove is coupled with the medium entering side, the effect of the groove can be obtained. Therefore, a large effect can be derived if the groove above the foregoing dimensions is continuously formed until reaching at least the edge of the slide surface on the medium entering side.

As will be obvious from the above description, according to the invention, it is possible to provide an excellent magnetic head assembly in which the substantial pressure between the recording medium and the slide surface (namely, the repulsive force between the head and the medium) is reduced, the deformation of the magnetic recording medium is prevented, the spacing is decreased, and the spacing loss can be lowered.

What is claimed is:

1. A method of manufacturing a magnetic head assembly, said method comprising the steps of:
   preparing a base plate having a sliding surface on which a magnetic recording medium slides and a joining surface substantially perpendicular to the sliding surface;
   forming a magnetic core on the joining surface of the base plate, the magnetic core including a pair of magnetic thin films having a magnetic gap therebetween;
   preparing a reinforcing member having a sliding surface on which the magnetic recording medium slides and a joining surface substantially perpendicular to the sliding surface of the reinforcing member;
   forming a plurality of grooves on the sliding surface of the reinforcing member, the plurality of grooves extending in a direction substantially parallel to the direction in which the magnetic recording medium slides;
   aligning the sliding surface of the base plate with the sliding surface of the reinforcing member and arranging the magnetic core between the joining surface of the base plate and the joining surface of the reinforcing member; and
   joining, subsequent to the step of forming the plurality of grooves on the sliding surface of the reinforcing member, the base plate, having the joining surface on which the magnetic core has been formed, to the reinforcing member, having the sliding surface on which the plurality of grooves have been previously formed.

2. A method according to claim 1, further comprising the step of arranging the plurality of grooves, which include at least a pair of grooves, to extend substantially parallel, one on either side of the magnetic gap on the magnetic recording medium slide surface.

3. A method according to claim 1, further comprising the step of joining the base plate and the reinforcing member such that the magnetic recording medium slides in a direction from the sliding surface of the reinforcing member to the sliding surface of the base plate.

4. A method of manufacturing a magnetic head assembly, said method comprising the steps of:
   preparing a base plate having a sliding surface on which a magnetic recording medium slides and a joining surface substantially perpendicular to the sliding surface;
   forming first and second magnetic cores on the sliding surface of the base plate, each of the first and second magnetic cores including a pair of magnetic thin films having a magnetic gap therebetween;
   preparing a reinforcing member having a sliding surface on which the magnetic recording medium slides and a joining surface substantially perpendicular to the sliding surface of the reinforcing member;
   forming first, second and third grooves on the sliding surface of the reinforcing member, the first, second and third grooves extending in a direction substantially parallel to the direction in which the magnetic recording medium slides;
   aligning the sliding surface of the base plate with the sliding surface of the reinforcing member, arranging the magnetic core between the joining surface of the base plate and the joining surface of the reinforcing member, arranging the first magnetic core between the first and second grooves and arranging the second magnetic core between the second and third grooves; and
   joining, subsequent to the step of forming the grooves on the sliding surface of the reinforcing member, the base plate, having the joining surface on which the first and second magnetic cores have been formed, to the reinforcing member, having the sliding surface on which the first, second and third grooves have been previously formed.

* * * * *

UNITED STATES PATENT AND TRADEMARK OFFICE
CERTIFICATE OF CORRECTION

PATENT NO. : 5,065,500              Page 1 of 2
DATED : November 19, 1991
INVENTOR(S) : Kou Yoneda, et al.

It is certified that error appears in the above-identified patent and that said Letters Patent is hereby corrected as shown below:

COLUMN 2

Line 49, "that" should read --so that--.

COLUMN 3

Line 21, "cross sectional" should read
--cross-sectional--;
　　Line 46, "cross sectional" should read
--cross-sectional--;
　　Line 60, "core" should read --core,--; and
　　Line 61, "core, 13" should read --core 13--.

COLUMN 5

Line 25, "without&" should read --without--;
　　Line 55, the right margin should be closed up; and
　　Line 56, the left margin should be closed up.

UNITED STATES PATENT AND TRADEMARK OFFICE
CERTIFICATE OF CORRECTION

PATENT NO. : 5,065,500
DATED : November 19, 1991
INVENTOR(S) : Kou Yoneda, et al.

It is certified that error appears in the above-identified patent and that said Letters Patent is hereby corrected as shown below:

COLUMN 6

Line 1, "to" should be deleted.

COLUMN 7

Line 25, "reinforcing" should read --a reinforcing--.

Signed and Sealed this

Ninth Day of March, 1993

Attest:

STEPHEN G. KUNIN

Attesting Officer

Acting Commissioner of Patents and Trademarks